Nov. 17, 1970  G. BAUER  3,540,869
GRINDING MEMBERS CONTAINING A BINDER OF A COPOLYMER
OF AN UNSATURATED POLYESTER RESIN AND A
POLYMERIZABLE ETHYLENE DERIVATIVE
Filed Aug. 25, 1967
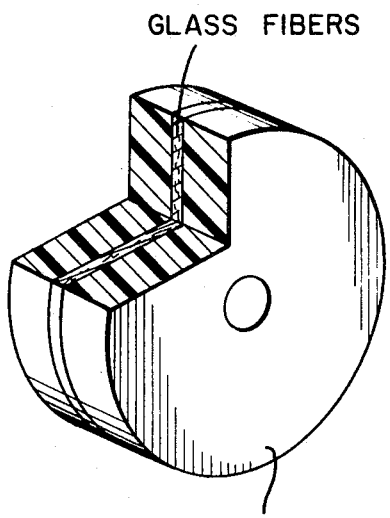
GLASS FIBERS
COMPOSITION
INCLUDING
ABRASIVES, etc.
AND RESINOUS
BINDER
INVENTOR
GERHARD BAUER
BY Wenderoth, Lind & Ponack
ATTORNEYS

United States Patent Office 3,540,869
Patented Nov. 17, 1970

3,540,869
GRINDING MEMBERS CONTAINING A BINDER OF A COPOLYMER OF AN UNSATURATED POLYESTER RESIN AND A POLYMERIZABLE ETHYLENE DERIVATIVE
Gerhard Bauer, Haltingen, Germany, assignor to Esterol A.G., Basel, Switzerland
Continuation-in-part of application Ser. No. 524,869, Feb. 3, 1966. This application Aug. 25, 1967, Ser. No. 663,409
Claims priority, application Switzerland, Sept. 2, 1965, 12,277/65
Int. Cl. C08g *51/12;* C08h *17/12*
U.S. Cl. 51—298                                18 Claims

ABSTRACT OF THE DISCLOSURE

Novel grinding elements, such as grindstones, grinding wheels and the like, contain, in addition to abrasive and if desired, other additives, a binder which is a copolymer of at least one unsaturated polyester resin and at least one originally liquid polymerizable ethylene derivative, with or without a polyisocyanate and/or a polyunsaturated solid polymerizable ethylene derivative, and if desired glass fibers. The latter may be in the form of an inset layer disposed at right angles to the rotational axis of the grinding wheel. Method of preparation, including a curing or hardening step in the presence of a hardening catalyst, is disclosed.

---

The present application is a continuation-in-part of copending application, Ser. No. 524,869 now abandoned, filed Feb. 3, 1966.

The present invention relates to grinding members having improved physical properties and also to a method of making grinding members which is particularly economical.

Rigid grinding members of a great variety of compositions are known.

The abrasives used for the production of grinding members are often ceramically bonded together, sometimes with added adhesives, and are subjected to a prolonged firing. These grinding members have a high abrasion resistance but are susceptible to breakage.

Grinding members have hitherto also been known which are bonded together by plastics; synthetic resins, for example phenoplasts, are used as binding agents for this purpose. During the manufacturing process of these grinding members, they are subjected to a prolonged programmed heat treatment (predetermined according to a plan).

Prior art conventional phenol resin-bonded grinding members have the disadvantage that they are neither shrink-resistant nor free from cracks; moreover they are subject to impairment of flexural strength of resistance to pressure or to compression, and of resistance to rupture, and of other physical values by the action external influences; loss of hardness is engendered by the cooling liquids used during the grinding process. Storage of these grinding members in a moist atmosphere also causes an undesirable falling off in hardness and a decrease in the flexural strength resistance to compression and resistance to bursting.

According to the present invention, polyester resins are employed in admixture with liquid polymerizable ethylene derivatives, as binder. This results in the technically significant improvement that there is no impairment of flexural strength, resistance to compression or of resistance to bursting and no reduction in hardness due to the action of cooling agent. Grinding members of any thickness, which are shrinkproof and crack-free, can be prepared, using propolymerized mixtures of unsaturated polyester resins, liquid polymerizable ethylene derivatives and polymerization catalysts. These grinding members, in comparison with ceramically-bonded grinding members, have greater elasticity and therefore decreased liability to breakage. It is of particular economic importance that it is only necessary to harden grinding members bonded with unsaturated polyester resins, for a short period of time (at most a few hours) at temperatures up to about 110° C., whereas ceramically-bonded grinding members have to be fired for a long time at about 1300° to 1450° C., and grinding members bonded with Bakelite type synthetic resins have to be baked for a long time at 200° to 280° C.

By "hardening" is meant the conversion of polyester resins or polyester resin mixtures from the soluble into the insoluble form.

If it is desired to have stable "green" (unfired) presslings or moldings, e.g. freshly pressed or molded wheels or disks which may be removed from e.g. the sections of the mold without deformation, solid powdered unsaturated polyester resin and/or solid powdered polystyrene and/or solid powdered polyethylene may be added to the composition which is to be molded or pressed and which consists of unsaturated polyester resin, ethylene derivative and catalyst, the abrasive being added preliminarily or subsequently. The solid powdered unsaturated polyester resin is polymerized into the bonding agent (binder), thus becoming a part thereof with consequent enhancement of the bond; the solid powdered polystyrene merely acts as a polymeric filler and enhances elasticity and toughness; the finely powdered polyethylene functions as a flux or flow enhancing agent.

A stronger bond of the grinding member, which makes possible the use of higher speeds of rotation, can be achieved by adding polyisocyanates, more especially high molecular polyisocyanates, for example triisocyanates to the prepolymerized mixture of at least one unsaturated polyester resin and at least one liquid polymerizable ethylene derivative and a polymerization catalyst. By an addition reaction of the isocyanate groups with reactive hydrogen atoms of the polyester, a stronger crosslinking is achieved than with the liquid ethylene derivative alone. The tensile strength at rupture and the tear resistance and abrasion resistance of the girnding members are thus increased.

When solid powdered unsaturated polyester resins are used to increase viscosity and to strengthen the bond, there can be added to these, if desired, in place of part of the liquid polymerizable ethylene derivatives, a polyunsaturated, normally solid polymerizable ethylene derivative, advantageously triallyl cyanurate, as reaction partner, so that again a stronger crosslinking is achieved, and the heat distortion temperature thereby raised.

In addition, there can also be added colorless, finely pulverulent oxides of at least bivalent metals, e.g. alkaline earth metals, such as calcium oxide or aluminum oxide or, optimally, magnesium oxide. The oxides should not impart any color to the grinding members; thus, iron-III-oxide is not suitable. By salt formation with terminal carboxy groups of the polyester, the oxides bring about a lengthening of the chain of the unsaturated polyester.

The present invention therefore relates to new grinding members which contain, in addition to abrasives and optionally additives, a binder which is a copolymer of at least one unsaturated polyester resin and at least one polymerizable ethylene derivative with or without a polyisocyanate and/or a plurally unsaturated, normally solid polymerizable ethylene derivative as well as with or without a polyisocyanate and/or a polyunsaturated (plurally unsaturated), normally solid polymerizable ethylene derivative, the terminal carboxy groups of the polyester being thus optionally at least in part in the form of salts of an at least bivalent metal, the said grinding members also containing, if desired, glass fibers or glass fiber textile inserts.

It is especially advantageaus for the grinding mtmbers to be provided perpendicularly to the axis of rotation thereof with at least one layer of a fabric of artificial fibers, e.g. glass fibers or synthetic fibers. In the case of separating disks (very thin disks), a central carrier of fabric is employed or also washers of impregnated glass textile fabric on the outer surfaces (prepregs).

The invention also relates to a method of preparing these grinding members, the method comprising the following steps:

(1) At least one catalyst, with or without an accelerator and/or an inhibitor and/or a polyisocyanate are added to a unpolymerized or prepolymerized mixture of at least one unsaturated polyester resin and at least one first liquid polymerizable ethylene derivative;

(2) The resultant liquid-to-viscous mixture is if desired mixed with an unpolymerized or prepolymerized second liquid polymerizable ethylene derivative (the first and second ethylene derivatives may be identical or different and the two prepolymers may be prepolymerized to different extents);

(3) The liquid-to-viscous mixture obtained according to (1) or (2) is mixed with abrasives, if desired with additives and/or solid unsaturated polyester resins and/or at least one solid polymer of an ethylene derivative and/or a plurally unsaturated, normally solid polymerizable ethylene derivative and/or at least one oxide of an at least bivalent metal and/or glass fibres; and (4) The so-obtained composition shaped into the form of grinding members and the latter cured (hardened) by copolymerization.

For this purpose, a mixture of at least one unsaturated polyester and at least one first liquid polymerizable ethylene derivative is prepolymerized and the prepolymerized mixture thus obtained is mixed with a second liquid polymerizable ethylene derivative (the first and second ethylene derivatives being identical or different), and with a catalyst in the presence of an accelerator, abrasives and if desired additives and/or at least one solid unsaturated polyester resins and/or at least one solid polymer of an ethylene derivative and/or a plurally unsaturated, normally solid polymerizable ethylene derivative and/or at least one oxide of an at least bivalent metal and/or glass fibres being added at any stage of the process, and the resultant composition is shaped.

Favorable results are also obtained when (a) a mixture of at least one unsaturated polyester resin and at least one first liquid polymerizable ethylene derivative and (b) a second liquid polymerizable ethylene derivative (the first and second ethylene derivatives being identical or different) are prepolymerized separately and if desired to different extents, the incompletely polymerized mixtures are then mixed with a catalyst, advantageously in the presence of an accelerator, and abrasive and if desired additives and/or solid unsaturated polyester resins and/or at least one solid polymer of an ethylene derivative and/or a plurally unsaturated, normally solid polymerizable ethylene derivative and/or at least one oxide of an at least bivalent metal and/or glass fibers being added at any stage of the process, and the resultant composition is shaped.

Incorporation of the prepolymerized binder or binder mixture into the abrasive and additives and the like is advantageously carried out when the catalyst has already been added to the prepolymerized binder or binder mixture.

According to an especially desirable embodiment, grinding members are prepared as follows: A mixture of at least one unsaturated polyester resin and at least one liquid polymerizable ethylene derivative, for example styrene, is prepolymerized using heat preferably for about 100 to about 120 minutes at temperatures from above room temperature up to below the boiling temperature of the ethylene derivative used, advantageously at from about 35° to about 45° C., and by the action of atmospheric oxygen, oxidizing substances and/or light, then cooled to room temperature so that the polymerization is interrupted; in this way polymerizable terminal groups remain which are required in the final polymerization.

Then another mixture of a liquid polymerizable ethylene derivative, for example styrene and optionally an accelerator is prepolymerized by using heat; this mixture is heated to from room temperature to the boiling temperature of the ethylene derivative used, advantageously to about 50° to about 60° C., under the action of atmospheric oxygen, oxidizing substances and/or light, advantageously for from about 20 to about 40 minutes, optimally about 30 minutes, and then cooled to room temperature (about 15 to about 25° C.). The polymerization is thus interrupted and polymerizable terminal groups remain which again are required for the final polymerization.

The two batches of prepolymerized mixture are then brought together, at least one polymerization catalyst, for example methyl ethyl ketone peroxide, cyclohexanone peroxide, cumene hydroperoxide, benzoyl peroxide and the like, and optionally an inhibitor, for example hydroquinone, is added and thoroughly mixed. Abrasive and additives may be added at any one or more stages of the process either together or separately; it is advantageous however to carry out the admixture after the catalyst has been added.

When a polyisocyanate is used it is advantageously added to the liquid-to-viscous components prior to the incorporation of the catalyst. When a solid unsaturated polyester resin and/or a solid polymer of an ethylene derivative and/or a plurally unsaturated, normally solid polymerizable ethylene derivative are used, these are in general mixed into the mixture of liquid-to-viscous components and abrasive. If use is made of an oxide of an at least bivalent metal, it has to be incorporated into the liquid resin before the addition of abrasive.

The composition thus obtained, which begins to copolymerize and is pasty to capable of flowing, is filled into a mold which is preferably provided with a mold release agent and/or a lining. As lining, there may be used, for example foil, paper or non-woven fabric fleece. Silicone spray, silicone oil, polymerized tetrafluoroethylene (Teflon) spray, kerosene, waxy materials, graphite and the like may be used as mold release agents. The composition is then press-molded under a pressure which is advantageously 150 to 250, and optimally 200, kg./sq. cm. for a short time, for example 1 to 60 seconds or more. Compaction may also be effected with a vibratory system.

The molding may be removed from the mold immediately after pressing. In this way the molds can be used more frequently. The press-molded articles may be allowed to cure at room temperature after they have been removed from the mold. If it is desired to accelerate the cure, heat may be used, for example in a drying chamber at from 40° C. to 50° C.; it is also possible to use preheated or heatable molds, or the press-moldings may be cured hot in a kiln; for example grinding members of a specific size may be cured (hardened) in 30 minutes in a drying kiln or the like at from 70° C. to 100° C. Any other type of drying and curing may be used.

Following hardening (curing), the grinding member is trued up and is then ready for use.

For a particular embodiment it has been found to be favorable to incorporate glass fibers, cut short, having a length of for example 5 mm. to 6 mm., into the mixture being processed, so that bond, impact strength, flexural strength, compressive strength and resistance to bursting of the grinding members are improved.

When glass fibers are used in the production of the grinding members, these are advantageously added after the abrasive and additives have been incorporated, and mixing is continued only until a homogeneous mixture has been formed, because mixing for too long may result in undue size reduction of the glass fibers and consequently in a decrease in the mechanical strength of the grinding member.

In order, according to the invention, to prepare grinding members which contain at least one layer of a fabric of artificial fibers, e.g. glass fibers or synthetic fibers, use can be made, as outer layer and/or as insert, of a fabric, e.g. glass fiber fabric (prepreg) impregnated with at least one unsaturated polyester resin. The prepreg is included in the pressing operation and is polymerized in with the other polymerizable substances.

Styrene is particularly suitable as a liquid polymerizable ethylene derivative.

Certain peroxides in combination in some cases with accelerators are suitable as catalysts for the cold curing of the grinding members. For example when for example ketone peroxides (methyl ethyl ketone perioxide or cyclohexanone peroxide) are used, metal salts of organic acids, such as cobalt naphthenate and coblat octoate, can serve as accelerators. Tertiary aromatic amines, such as dimethylaniline or diethylaniline, are for example used as accelerators for peroxides derived from organic acids, such as benzoyl peroxide. Cumene hydroperoxide is, for instance, suitable as a catalyst for hot curing.

Among other compounds, polyhydric phenols, such as hydroquinone, can be used as inhibitors.

Silicon carbide, electrocorundum, precious corundum, quartz and the like are used as abrasives.

Additives include cryolite, pyrites, flint, quartz powder and the like.

As a solid polymer of an ethylene derivative, polystyrene and/or polyethylene is particularly suitable. As fluxing agent, polyethylene fine powder with a melt index of 20 to 250 and a density of 0.915 to 0.925, is particularly suitable. The grain size of such powder is between 5 and 75 microns, 80% of the powder being <40 microns, the average being 15 microns. Other polyalkylenes, such as polypropylene, can also be used for this purpose.

As polyunsaturated, normally solid polymerizable ethylene derivative, triallylcyanurate is optimal. If this is used in the solid phase, the temperature during pulverization, mixing, etc. should not exceed its melting point (26.5° C.).

The amounts specified in the following examples are parts by weight.

The examples are not limitative in any way because other proportions may be used. The choice of polyester resin, and the use of abrasives and additives, polymerization accelerators and polymerization catalysts is variable.

The examples have only an illustrative character; the invention is not intended to be limited to these examples.

The accompanying figure of drawing illustrates one form of grinding wheel embodiment according to the invention.

In Examples 2 to 8 an unsaturated polyester resin is used having an acid number of 45 which has been obtained in per se conventional manner from 2 moles of maleic acid, 1 mole of phthalic acid and 3.2 moles of 1,2-propylene glycol, 70 to 75 parts of polyester being dissolved in 30 to 25 parts of styrene and being stabilized by adding 0.02 part of hydroquinone.

Other commercially available unsaturated polyester resins can also be used in the following examples, e.g. those available on the market as "Leguval N 20"; "Leguval N 20" combined with "Leguval E 80" or "Leguval E 81"; "Roskydal N 20" or "Roskydal N 21"; "Roskydal N 20" or "Roskydal N 21" combined with "Roskydal W 80" or "Roskydal W 81"; "Vestopal H"; "Vestopal H" combined with "Vestopal W" or "Vestopal M"; "Palatal P4"; "Palatal P6"; "Palatal P4" or "Palatal P6" combined with "Palatal E 200" or "Palatal E 210." When mixtures of polyester resins are used, they must be miscible.

The above mentioned Leguvals are polyesters prepared from dicarboxylic acids such as maleic acid and fumaric acid esterified with alcohols such as ethyleneglycol, 1,2-propylene glycol and 1,3-butylene glycol and mixtures thereof in molar proportions. The unsaturated dicarboxylic acids may be replaced in part by saturated dicarboxylic acids, for example phthalic acid or adipic acid. All Palatal resins are unsaturated polyesters, most of them being dissolved in styrene. They are prepared by esterifying 1 mol of an unsaturated dicarboxylic acid with 1 mol of a dihydric alcohol. Some of the unsaturated acid may be substituted by saturated acids. Among the suitable unsaturated dicarboxylic acids employed in Palatal resins are maleic acid, maleic anhydride and fumaric acid.

EXAMPLE 1

| | Parts |
|---|---|
| Standard corundun, grain 46 | 95.5 |
| Cryolite, 5 to 30 microns | 4.5 |
| Unsaturated polyester resin mixture dissolved in styrene (from 70 to 75% of polyester) | 6.7 |
| Triisocyanate (commercially available as Desmodur R" or Desmodur RF") solution (66% solution in styrene or ethyl acetate) | 3.3 |
| Accelerator solution (cobalt naphthenate in styrene, 1% metal content) | 0.4 |
| Catalyst solution (70% cumene hydroperoxide in cumene | 0.22 |

Two commercially available unsaturated polyester resins, one of a hard type and the other of a soft type, are mixed in the ratio 6:1. Triisocyanate and accelerator solution are added. Then the catalyst is stirred in well.

The liquid resin mixture thus obtained is then intensely worked into the abrasive grain (corundum). Cryolite is then added as a filler.

The finished mixture thus obtained is filled into a mold which may be provided with a mold release agent or a lining. The mixture is press-molded for 30 seconds at 200 kg./sq. cm.

After the molding has been removed from the mold, it is laid on a smooth support and cured in a drying kiln at from 70° C. to 110° C.

After the grinding member has cooled, it may be trued to shape and size.

EXAMPLE 2

| | Parts |
|---|---|
| Standard corundum, grain 46 | 95.5 |
| Cryolite, 5 to 30 microns | 4.5 |
| Prepolymerized mixture of 70 to 75% of unsaturated polyester resin and 30 to 25% of styrene | 10.0 |
| Accelerator solution as in Example 1 | 0.4 |
| Catalyst solution (40% methyl ethyl ketone peroxide in dimethyl phthalate) | 0.22 |

The accelerator solution is incorporated into the prepolymerized polyester monomer mixture and then the methyl ethyl ketone peroxide is added and stirred in homogeneously.

The abrasive grain is mixed with cryolite. Then the liquid mixture obtained above is worked in. All the surfaces of the abrasive grain should be well wetted.

The composition thus obtained, which is capable of flowing, is filled into a metal mold, which may if desired be provided with a mold release agent. The composition is pressed at 200 kg./sq. cm. for 20 to 60 seconds; the pressure is preferably applied for 30 seconds.

The so-obtained press-molding is removed from the mold and laid on a flat support. The molding may be cured at somewhat elevated temperature (20° C. or more); after it has been cured it may be trued up in the usual way.

A molding which has been cured at room temperature may be subsequently annealed at from 70° C. to 80° C.

The filler, for example cryolite, may be homogeneously incorporated into the mixture of polyester resin and monomer prepared according to the process.

EXAMPLE 3

| | Parts |
|---|---|
| Standard corundum, grain 46 | 95.5 |
| Cryolite, 5 to 30 microns | 4.5 |
| Prepolymerized mixture of unsaturated polyester resins and styrene (70 to 75% of unsaturated polyester resin) | 10.0 |
| Glass fiber cut short (6 mm.) | 1.45 |
| Accelerator solution as in Example 1 | 0.4 |
| Catalyst solution as in Example 2 | 0.22 |

The accelerator solution is incorporated into the prepolymerized mixture of polyester resin and monomer and then the methyl ethyl ketone peroxide solution is added and stirred in well. Cryolite is added and homogenized. The mixture thus obtained is added to the abrasive grain and thoroughly mixed in. Glass fibers cut short are incorporated. It may be advisable to wet the glass fibers with a little monostyrene so that they may be wetted better with the mixture of polyester resin and monostyrene.

The composition, which is pasty to flowable, is filled into a mold, which may be provided with a mold release agent or a lining. A pressure of 200 kg./sq. cm. is applied for 20 to 60 seconds, preferably for 30 seconds.

The press-molding may be removed from the mold and cured on a smooth support at room temperature or higher (20° C. or more); after cure has been completed, it may be trued up in the usual way.

The speed of reaction of the above processing mixture and of the cure of the molding may be accelerated by preheating the press-mold and/or by subsequent heating or quite generally by the use of heat; for example grinding members of specific size may be cured at from 70° C. to 90° C. in a drying kiln in 30 minutes after removal from the mold.

EXAMPLE 4

| | Parts |
|---|---|
| Standard corundum, grain 46 | 95.5 |
| Cryolite, 5 to 30 microns | 4.5 |
| Prepolymerized mixture of unsaturated polyester resin and styrene (70 to 75% of unsaturated polyester resin) | 6.7 |
| Triisocyanate solution as in Example 1 | 3.3 |
| Accelerator solution as in Example 1 | 0.4 |
| Catalyst solution as in Example 1 | 0.22 |

Triisocyanate solution and accelerator solution are mixed with the prepolymerized mixture of polyester resin and monomer and then the catalyst solution is stirred in well.

The abrasive grain and the additive (cryolite) are mixed in a mixing appliance and then the above resin combination is worked in intensely so that all the surfaces of the abrasive grain are wetted.

The flowable composition thus obtained is filled into a mold which may be provided with a mold release agent; a lining of paper or non-woven fabric may also be used. The composition is pressed for 20 to 60 seconds, preferably for 30 seconds, at 200 kg./sq. cm.

The press-molding thus formed is removed from the mold, laid on a flat support and cured in a drying kiln at from 70° C. to 105° C. The grinding member may be removed from the drying kiln after about 1 hour and after it has been cooled may be trued up as usual.

In another embodiment, an enclosure of glass cloth impregnated with polyester resin is used for mechanical stabilization. (Prepregs made of glass fabrics with taffeta weave or leno weave. Leno weave is one in which every two or three adjacent warp threads are twisted round each other.)

EXAMPLE 5

| | Parts |
|---|---|
| Standard corundum, grain 46 | 95.3 |
| Cryolite, 5 to 30 microns | 4.8 |
| Prepolymerized mixture of 70 to 75% of unsaturated polyester resin and 30 to 25% of styrene | 6.7 |
| Triisocyanate solution as in Example 1 | 3.2 |
| Solid powdered polystyrene | 2.7 |
| Accelerator solution as in Example 1 | 0.15 |
| Catalyst solution as in Example 1 | 0.21 |

The accelerator solution and the triisocyanate solution are mixed with the prepolymerized polyester resin-monomer mixture and then the catalyst is stirred in well.

The above liquid resin mixture is added to the abrasive grain which is in a mixing or kneading appliance and is intensely worked in so that all surfaces of the abrasive grain are wetted. The powdered polystyrene is then added followed by the cryolite.

The processing mixture thus obtained is introduced into a mold which may be provided with a mold release agent and/or a lining. The mixture is pressed at 200 kg./sq. cm. for 20 to 60 seconds, preferably 30 seconds.

The press-molding is removed from the mold, laid on a flat surface and cured in a drying kiln at from 70° C. to 105° C. After 1 hour the grinding member may be removed from the drying kiln, cooled and trued up in a conventional way.

The grinding member may also be provided with a glass cloth enclosure (on the outside) or a glass cloth insert (prepreg).

EXAMPLE 6

| | Parts |
|---|---|
| Standard corundum, grain 46 | 95.3 |
| Cryolite, 5 to 30 microns | 4.8 |
| Prepolymerized mixture of 70 to 75% of unsaturated polyester resin and 30 to 25% of styrene | 6.7 |
| Triisocyanate solution as in Example 1 | 3.2 |
| Solid powdered unsaturated polyester resin | 4.8 |
| Triallyl cyanurate | 0.7 |
| Accelerator solution as in Example 1 | 0.18 |
| Catalyst solution as in Example 1 | 0.21 |

The accelerator solution and the triisocyanate solution are mixed with the prepolymerization mixture of polyester resin and monomer and then the catalyst is stirred in well.

The liquid resin mixture thus obtained is added to the abrasive grain in a mixing or kneading appliance and intensely worked in so that all surfaces of the abrasive grain are wetted. The powdered polyester resin is mixed with the powdered triallyl cyanurate and mixed into the composition in the mixing appliance. Then the cryolite is incorporated.

The processing mixture thus obtained is placed in a mold which may be provided with a mold release agent or a lining. Pressure of 200 kg./sq. cm. is applied for 20 to 60 seconds, preferably 30 seconds.

The press-molding is removed from the mold, laid on a flat support and cured in a drying kiln at from 70° C. to 108° C. After about 2 hours, the grinding member may be removed from the drying kiln, allowed to cool and trued up as usual.

EXAMPLE 7

| | Parts |
|---|---|
| Standard corundum, grain 46 | 95.3 |
| Cryolite, 5 to 30 microns | 4.8 |
| Prepolymerized mixture of 70 to 75% of unsaturated polyester resin and 30 to 25% of styrene | 6.3 |
| Triisocyanate solution as in Example 1 | 3.1 |
| Solid powdered unsaturated polyester resin | 2.7 |
| Solid powdered polystyrene | 0.8 |
| Accelerator solution as in Example 1 | 0.25 |
| Catalyst solution as in Example 1 | 0.27 |

The triisocyanate solution and accelerator solution are mixed with the prepolymerized mixture of polyester resin and monomer and then the catalyst is stirred in well.

The liquid resin mixture thus obtained is added to the abrasive grain in a mixing or kneading appliance and intensely worked in so that all the surfaces of the abrasive grain are wetted.

The powdered polyester resin is mixed with the powdered triallyl cyanurate. Then the powdered polystyrene and the cryolite are added. This dry mixture is mixed well into the composition in the mixing appliance.

The processing mixture thus obtained is filled into a mold which may be provided with a mold release agent and/or a lining (paper, glass cloth). Pressure of 200 kg./sq. cm. is applied for 20 to 60 seconds, preferably 30 seconds.

The press molding is removed from the mold, laid on a smooth support and cured in a drying kiln at from 70° C. to 110° C. After about 2 hours the grinding member may be removed from the drying kiln, cooled and trued up in a conventional way.

EXAMPLE 8

| | Parts |
|---|---|
| Standard corundum, grain 46 | 95.45 |
| Cryolite, 5 to 30 microns | 4.55 |
| Prepolymerized mixture of 70 to 75% of unsaturated polyester resins and 30 to 25% of styrene | 6.3 |
| Triisocyanate solution as in Example 1 | 3.0 |
| Solid powdered unsaturated polyester resin, 80 to 90 microns | 2.75 |
| Solid powdered styrene, 80 to 90 microns | 2.75 |
| Solid finely powdered polyethylene, high pressure-polyethylene-fine powder 15 to 17 microns, melt index 200 | 0.5 |
| Magnesium oxide | 0.23 |
| Catalyst solution as in Example 1 | 0.23 |

The triisocyanate solution is added to the polyester resin-monomer mixture, after which the catalyst is worked in; then magnesium oxide and polyethylene-fine powder are added and the whole stirred well.

The obtained mixture is added and intensively worked into the abrasive grain in a mixing or kneading appliance so that all the surfaces of the abrasive grain are wetted.

Then the powdered polyester resin, the powdered polystyrene and the cryolite are added, and the entire mixture is homogenized in the mixing appliance.

The so-obtained mixture is filled into a mold which may be provided with a mold release agent and/or with a lining, and then pressure of 200 kg./sq. cm. is applied for 20 to 60 seconds, preferably 30 seconds.

The press-molding is removed from the mold, laid on a smooth support and hardened (cured) in a drying kiln at 70° C. to 110° C. (1 hour at 80° C. and 2 hours at 110° C.). The grinding element can then be removed from the drying kiln, slowly cooled and then trued up.

It is also possible to follow the procedure of Examples 2 to 8, but employing mixtures of unsaturated polyester resins and monomers which are not prepolymerized. In the procedure of Examples 2 to 7 it is also possible to add the accelerator solution to the mixture of unsaturated polyester resins and styrene before it is prepolymerized. If hot-hardening (curing) is carried out, and accelerator is not absolutely necessary, because activation is achieved by the applied heat.

What is claimed is:
1. A method of preparing grinding members selected from the group consisting of grinding wheels and grind stones comprising:
 (I) admixing:
  (a) styrene,
  (b) a polyester, unpolymerized or prepolymerized with a member selected from the group consisting of styrene and triallylcyanurate, said polyester being selected from the group consisting of polymerized esters of maleic and fumaric acids alone or in admixture with phthalic and adipic acids,
  (c) abrasive grains, and
  (d) a peroxide catalyst;
 (II) molding and curing the above mixture into the shape of the desired grinding member.
2. The process of claim 1, wherein polyisocyanates are added to the prepolymerized mixture of polyester.
3. The process according to claim 2, wherein the polyisocyanate is a triisocyanate.
4. The process of claim 3, wherein the polyester is prepared from maleic acid and phthalic acid esterified with 1,2-propylene glycol.
5. The process of claim 4, wherein the polyester is prepared from 2 mols of maleic acid to 1 mol of phthalic acid and 3.2 mols of 1,2-propylene glycol.
6. The process of claim 5, wherein a triisocyanate is added.
7. The process of claim 6, wherein an accelerator selected from the group consisting of metal, salts of organic acids and tertiary aromatic amines are employed.
8. The process according to claim 7, wherein corundum is employed as the abrasive grain.
9. The process according to claim 8, where cryolite is added as a filler.
10. The process of claim 9, wherein the molding is carried out for 30 seconds at 200 kg./sq. cm.
11. The process of claim 10, wherein the molded grinding member is cured at from 70 to 110 C.
12. A process according to claim 5, wherein a member selected from the group consisting of polystyrene and polyalkylenes is added prior to curing and molding.
13. The process of claim 12, wherein the polyethylene is polyethylene powder having a melt index of from 20 to 250, a density of 0.915 to 0.925 and an average grain size of 15 microns is employed.
14. The process of claim 12, wherein polystyrene is employed.
15. The process of claim 5, wherein the mixture prior to molding and curing is stabilized with hydroquinone.
16. A grinding member prepared in accordance with the process of claim 1.
17. A grinding member prepared in accordance with the process of claim 2.
18. A grinding member prepared in accordance with the process of claim 3.

References Cited
UNITED STATES PATENTS

| 2,273,891 | 2/1942 | Pollack et al. | 51—298 |
| 2,880,080 | 3/1959 | Rankin et al. | 51—298 |
| 3,106,537 | 10/1963 | Simon | 51—298 |
| 3,402,034 | 9/1968 | Schnabel | 51—298 |
| 3,432,451 | 3/1969 | Kales | 51—298 |

DONALD J. ARNOLD, Primary Examiner

U.S. Cl. X.R.

51—299